United States Patent Office 3,631,093
Patented Dec. 28, 1971

3,631,093
8[9→10]-ABEO-STEROIDS
Manuel Debono, Indianapolis, Ind., assignor to Eli Lilly
and Company, Indianapolis, Ind.
No Drawing. Filed Feb. 20, 1970, Ser. No. 13,206
Int. Cl. C07c *49/44, 69/14*
U.S. Cl. 260—488 B        5 Claims

ABSTRACT OF THE DISCLOSURE

8[9→10]-abeo-steroids and their 3-enolacylates, active as anti-androgens.

BACKGROUND OF THE INVENTION

Jeger and his co-workers [Helv. Chem. Acta, 51, 1362 (1968)] have discussed the photolysis of 6α,7α-oxido-androsta-4,5 (6)-dien-17β-hydroxy-3-one-17-acetate.

SUMMARY

This invention provides a process for preparing 8[9→10]-abeo-steroids and their 3-enolacylates according to the following equation:

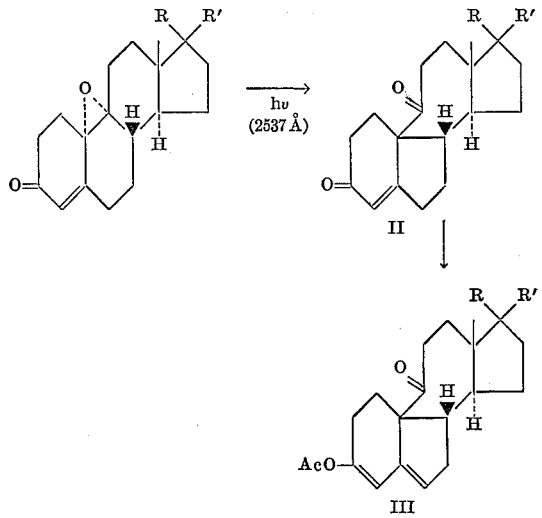

Wherein R and R', when taken singly, are chosen from the group pairs consisting of hydrogen and hydroxyl, ethinyl and hydroxyl, vinyl and hydroxyl, methyl and hydroxyl, ethyl and hydroxyl, propyl and hydroxyl, and acetyl and hydrogen and, when taken together are a carbonyl group, and Wherein Ac is a lower alkanoyl group such as acetyl, propionyl, butyryl, formyl or isobutyryl.

In carrying out the first step of the above reaction sequence the 9α, 10α oxide (I) is irradiated with ultra-violet light in an inert solvent. Ultra-violet light having a wave length of 2537 A is preferred. Useful inert solvents for the irradiation reaction include high-boiling alcohols or ketones and t-butanol has been a particular useful solvent for the irradiation. The 8[9→10]-abeo-steroid (II) is converted to the corresponding 3-enolacylate (III) by treatment with an acylating agent such as an anhydride to which a catalytic quantity of perchloric acid has been added or by using a mixture of the anhydride and the corresponding acyl chloride. The reaction producing the enolacylate is terminated after a reaction time of from 3 to 7 minutes, since longer reaction times produce undesirable by-products.

The compounds of this invention are anti-androgens. For example, 3,17β - dihydroxy - 8[9→10] - abeo - estra-3,5-diene-9-one-diacetate in a standard test is a 25 percent or better inhibitor of the androgenic stimulation of the growth of seminal vesicles, ventral prostates and levator ani muscles, as measured by their weights when compared with the weights of organs from untreated control animals. 17β - hydroxy - 17α - ethinyl - 8[9→10] - abeo-estr-4-ene-3,9-dione also has shown anti-androgenic activity in the same standard tests. The compounds of this invention are active as anti-androgens in dosage ranges from 0.5 to 5 mg. and can be administered to animals in the same dosage forms as are utilized for administration of steroid androgens or other steroid hormones.

This invention is also further illustrated by the following specific examples:

EXAMPLE I

17β-hydroxy-8[9→10]-abeo-estr-4-ene-3,9-dione

One and one-half grams of 9α,10α-oxido-estr-4-ene-17β-ol-3-one were dissolved in 750 ml. of t-butanol and the resulting solution was irradiated for 2.5 hours with ultra-violet light at 2537 A. The irradiation was carried out under a nitrogen atmosphere in a quartz photo-chemical reactor using 16 R.P.R. 2537 A lamps as a light source. A 70 percent yield of 17β - hydroxy - 8[9→10] - abeo-estr-4-ene-3,9-dione was obtained after removal of the solvent in vacuo and separation of the abeo-steroid product from the starting material by chromatography over silica-gel (60–200 mesh). 17β - hydroxy - 8[9→10] - abeo-estr-4-ene-3,9-dione has the following properties: M.P.= 215–216° C. after recrystallization from acetone.

Infra-red spectrum showed carbonyl peaks at 1685 cm.$^{-1}$, using chloroform as a solvent.

Ultra-violet spectrum showed a maxima at 233 m$\mu$. ($\epsilon$=13,350, in ethanol.)

Nuclear magnetic resonance spectrum in deutrochloroform showed signals at 5.72 p.p.m. and 0.90 p.p.m.

Mass spectrum peaks were found at m/e=288 (molecular ion) and 135 (base peak=$C_9H_{11}O^+$).

Other compounds preparable by the above procedure include: 17β - hydroxy - 17α - methyl - 8[9→10] - abeo-estr - 4 - ene - 3,9 - dione (M.P.=176–177° C.) and 17β - hydroxy - 17α - ethinyl - 8[9→10] - abeo - estr-4-ene-3,9-dione (M.P.=234–235° C.).

EXAMPLE II 3,17β-dihydroxy-8[9→10]-abeo-estra-3,5-diene-9-one diacetate

One and two-fifths grams of 17β-hydroxy-8[9→10]-abeo-estr-4-ene-3,9-dione were added to a preheated solution (90° C.) of 24 ml. of acetic anhydride containing 12 ml. of acetyl chloride and 0.42 ml. of pyridine. The solution was stirred for 1 hour at 90° C., and then quenched by pouring into 300 ml. of an ice-water mixture. 3,17β - dihydroxy - 8[9→10] - abeo - estra - 3,5 - diene-9-one diacetate produced by the above reaction was isolated by filtration and recrystallized from an ether-pentane (3:1) solvent mixture. The compound had the following characteristics:

Infra-red spectrum: maxima at I: 1690 cm.$^{-1}$; 1725 cm.$^{-1}$; and 1750 cm.$^{-1}$ (carbonyl).

Ultra-violet spectrum:

$$\lambda_{max.}^{EtOH} = 235 \ (\epsilon = 15{,}500)$$

M.P.=150–151° C.

Starting materials useful in the above synthesis are prepared by the method of Farkas and Owen, J. Med. Chem. 19, 510 (1966).

Other compounds preparable by the process of this invention include:

17β-hydroxy-17α-vinyl-8[9→10]-abeo-estr-4-ene-3,9-dione;

17β-hydroxy-17α-ethyl-8[9→10]-abeo-estr-4-ene-3,9-dione;

17β-hydroxy-17α-n-propyl-8[9,10]-abeo-estr-4-ene-3,9-dione;
8[9→10]-abeo-pregn-4-ene-3,9,20-trione;
3,17β-dihydroxy-17α-ethinyl-8[9→10]-abeo-estra-3,5-diene-9-one diacetate;
3,17β-dihydroxy-17α-methyl-8[9→10]-abeo-estra-3,5-diene-9-one diacetate;
3,17β-dihydroxy-17α-ethyl-8[9→10]-abeo-estra-3,5-diene-9-one diacetate;
3,17β-dihydroxy-17α-n-propyl-8[9→10]-abeo-estra-3,5-diene-9-one diacetate;
3,17β-dihydroxy-17α-vinyl-8[9→10]-abeo-estra-3,5-diene-9-one diacetate.

I claim:
1. A compound of the formula

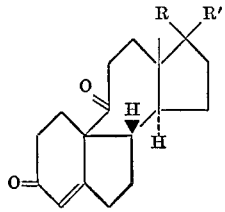

wherein R and R', when taken singly, are chosen from the group pairs consisting of hydrogen and hydroxyl, ethinyl and hydroxyl, vinyl and hydroxyl, methyl and hydroxyl, ethyl and hydroxyl, propyl and hydroxyl, and acetyl and hydrogen and when taken together are a carbonyl group.

2. A compound of the formula

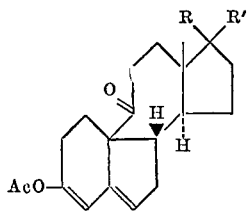

wherein R and R', when taken singly, are chosen from the group pairs consisting of hydrogen and hydroxyl, ethinyl and hydroxyl, vinyl and hydroxyl, methyl and hydroxyl, ethyl and hydroxyl, propyl and hydroxyl, and acetyl and hydrogen and, when taken together are a carbonyl group, and wherein Ac is a lower alkanoyl group.

3. A process for preparing 8[9→10]-abeo-steroids and their 3-enolacylates which comprises irradiating with ultraviolet light a compound of the formula

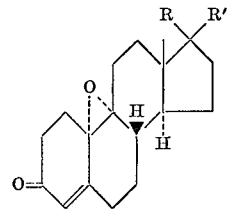

wherein R and R', when taken singly, are chosen from the group pairs consisting of hydrogen and hydroxyl, ethinyl and hydroxyl, vinyl and hydroxyl, methyl and hydroxyl, ethyl and hydroxyl, propyl and hydroxyl, and acetyl and hydrogen and, when taken together are a carbonyl group, to form an abeo-steroid of the formula

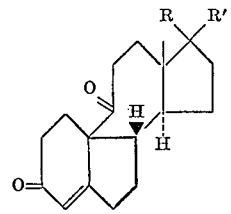

wherein R and R' are the same as herein above and then treating said compound with an acylating agent to form a compound of the formula

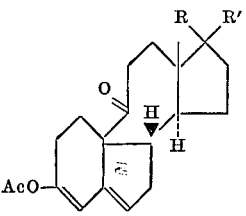

wherein R and R' have the same meaning as herein above and wherein Ac is a lower alkanoyl group.

4. A compound according to claim 1, said compound being 17β-hydroxy-8[9→10]-abeo-estr-4-ene-3,9-dione.

5. A compound according to claim 2, said compound being 3,17β - dihydroxy - 8[9→10]-abeo-estra-3,5-diene-9-one diacetate.

References Cited

Jeger et al., Helv. Chem. Acta, 51, 1362 (1968).

LORRAINE A. WEINBERGER, Primary Examiner
V. GARNER, Assistant Examiner

U.S. Cl. X.R.
204—158 HE; 260—232.55 R, 586 H; 424—311, 331